UNITED STATES PATENT OFFICE.

ALBERT FÜRST AND RUDOLPH SCHAUFELBERGER, OF DENVER, COLORADO.

COMPOSITION FOR BUILDING-STONE.

SPECIFICATION forming part of Letters Patent No. 387,221, dated August 7, 1888.

Application filed October 14, 1887. Serial No. 252,363. (No specimens.)

*To all whom it may concern:*

Be it known that we, ALBERT FÜRST and RUDOLPH SCHAUFELBERGER, citizens of the United States, residing at Denver, in the county of Arapahoe and State of Colorado, have invented a new and useful Improvement in Composition Building-Stone, of which the following is a specification.

Our invention relates to a composition building-stone and the ingredients thereof, and the proportions in which they are united are as follows: slag or coke, three parts; plaster-of-paris, one part.

The slag or coke is powdered very fine (about as fine as gravel) and then mixed with the plaster-of-paris, and when the materials are thoroughly mingled the mixture is placed in a mold and allowed to harden, and when it is removed it is ready for use.

We do not wish to limit ourselves strictly to the use of plaster-of-paris in the composition of this stone, as any ordinary cement will answer almost if not equally as well.

This composition is cast or molded into any desired shape, either into the shape and size of bricks or into large sized building-stones of any shape. They may be made ornamental in shape, and will serve the same purpose as dressed or chiseled stone.

It will be obvious from the ingredients used in the stone that it is fire-proof, and therefore of especial utility as the material for constructing partition-walls between buildings.

This stone is also impervious to water, and therefore of use as the material for constructing outside walls. It is also very much lighter than ordinary stone, and therefore more easily handled. Consequently the stones to be used in the construction of a building may be made much larger than they can if it is to be built of ordinary stone, and this will result in a saving of plaster and time. It will be understood that these stones are laid in plaster or cement in the usual manner.

Another advantage of this composition stone is that if the walls of a building are constructed of it the necessity of a roughing coat of plaster (namely, a first or foundation coat) is avoided. It is, therefore, only necessary to apply the finishing or sizing coat, and the appearance is equally as good, and it will be found much more durable than if a roughing coat had been first applied. Thus there is again a saving of inside plaster in using this building stone; also, the outside appearance presented by this stone will be very pleasing. The exposed side may be sized and polished, or otherwise ornamented, to present a very handsome appearance.

In addition to the advantages already cited, this stone may be very cheaply made, as both the ingredients are cheap, (especially the slag, which comprises the greater part of the composition,) and the manufacture of the stone may be very cheaply accomplished.

The proportions herein specified for the slag and plaster may be varied slightly at will—for instance, the proportion of the former may be increased to four-fifths of the whole and the latter reduced to one-fifth.

We are aware that it is not broadly new to employ slag in the manufacture of artificial stone; but the herein-described combination of slag and plaster-of-paris is, we believe, novel, and the resulting stone, after having been glazed with silica or other similar substance, is firm, hard, strong, light, and ornamental, and it is unaffected by heat and moisture.

Having thus described our invention, we claim—

The herein-described composition for building-stone, consisting of powdered slag and plaster-of-paris, as set forth.

In testimony that we claim the foregoing as our own we have hereto affixed our signatures in presence of two witnesses.

ALBERT FÜRST.
RUDOLPH SCHAUFELBERGER.

Witnesses:
H. E. LUTHE,
I. E. BARNUM.